United States Patent Office

3,041,374
Patented June 26, 1962

---

3,041,374
NOVEL N-ACYLSULFONAMIDES
Walter A. Gregory, Brandywine Hundred, Del., assignor to E. I. du Pont de Nemours and Company, Wilmington, Del., a corporation of Delaware
No Drawing. Filed Mar. 10, 1960, Ser. No. 13,991
5 Claims. (Cl. 260—556)

This invention relates to novel N-acylsulfonamides, certain salts thereof and to the preparation of these compounds.

These products find use in the general field of pest control and in the extraction of potassium from brine solutions such as sea water or well brines. Since the compounds render potassium ions insoluble in water they can be used to recover potassium from solutions containing mixtures of sodium and potassium salts. A general characteristic of these compounds is that they have a bitter taste, giving them general utility as repellents for rodents, rabbits, deer and other mammals.

The novel N-acylsulfonamides of the invention have an electronegative substituent on the alpha carbon of the acyl group and a hydrophobic moiety attached to the sulfonyl group. The compounds can be represented by the following structural formula:

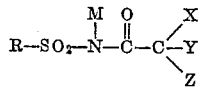

wherein R is selected from the group consisting of alkyl of from 5 through 8 carbon atoms, alpha-naphthyl, beta-naphthyl, and

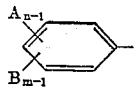

where:
A is chloro,
B is selected from the group consisting of chloro, alkyl of 4 to 5 carbon atoms, and phenyl,
$n$ is a whole number of from 1 through 5,
$m$ is a whole number of from 1 through 2;

X is selected from the group consisting of nitro, chloro, bromo, fluoro, phenylsulfonyl, p-methylphenylsulfonyl, and alkylsulfonyl wherein the alkyl contains from 1 through 12 carbon atoms; Y is selected from the group consisting of hydrogen, chloro, bromo, fluoro, phenyl, and alkyl of 1 through 3 carbon atoms; Z is selected from the group consisting of hydrogen, chloro, bromo, and phenyl; with the proviso that when X is selected from nitro, phenylsulfonyl, p-methylphenylsulfonyl, and alkylsulfonyl, Y must be selected from hydrogen, phenyl, and alkyl of from 1 through 3 carbon atoms, and Z must be hydrogen; and M is selected from the group consisting of hydrogen, sodium, potassium, ammonium, mono-, di-, tri- and tetramethylammonium, mono-, di-, and triethylammonium, and calcium and magnesium wherein the second valence of the metal is attached to another

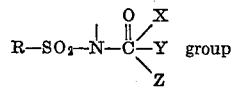
group

As stated previously, these N-acylsulfonamides have a hydrophobic moiety on the sulfonyl group attached to the nitrogen of the amide. The hydrophobic moiety permits the formation of water-insoluble potassium salts. In addition the alpha carbon of the acyl group carries an electronegative group such that the acids formed on hydrolyzing the compounds with alkali, have ionization constants K greater than $2 \times 10^{-5}$.

The compounds of this invention, when in acid form (M=H), are white crystalline solids, insoluble in aqueous media having a pH less than 4. They are strongly acidic compounds which form neutral salts with strong bases such as the alkali and alkaline earth metal hydroxides. The sodium salts are water-soluble. When a solution of a potassium salt is added to a sodium salt of an N-acylsulfonamide the corresponding potassium salt separates as a solid or immiscible phase. However, the potassium salts are soluble in N-butanol, ethyl acetate, ether and a wide variety of polar organic solvents.

The compounds of the invention may in general be prepared by the reaction of the appropriate acyl halide or anhydride with a sulfonamide according to the following reaction:

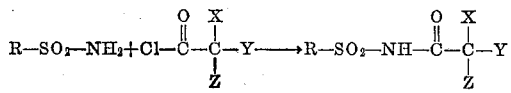

where X may be halogen and Y and Z are as previously described. In cases where X is other than halogen the compound can be prepared through the halogen-containing compound. Thus the compound wherein X is chlorine or bromine is prepared and then converted to the desired derivative via displacement of the halogen atom, i.e., sodium nitrite can be reacted with a chloroacetylsulfonamide in dimethylformamide to yield the desired compound:

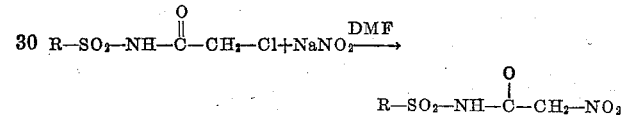

The analogous displacement reaction with a sodium hydrocarbylmercaptide and a chloroacetylsulfonamide and the subsequent treatment with an oxidizing agent such as hydrogen peroxide yields a compound wherein X is hydrocarbyl according to the following scheme:

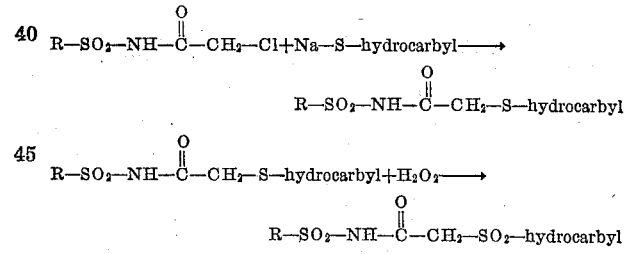

The reaction of a chloroacetylsulfonamide with a sodium hydrocarbyl sulfinate is also utilized as an alternative route for the formation of the compounds containing the hydrocarbylsulfonyl group.

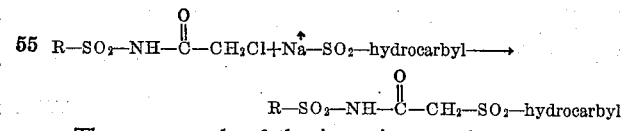

The compounds of the invention can be prepared by other procedures, such as by treating the appropriate acylsulfonamide with phosphorus pentachloride to introduce chlorine into the alpha position. Salts of these various acylsulfonamides are readily prepared by adding an equivalent quantity of the appropriate base.

The following examples serve to illustrate but are not intended to limit the instant invention.

EXAMPLE 1

*2,2-Dichloro-N-(3,4-Dichlorophenylsulfonyl)-Acetamide*

A mixture of 108 g. of 3,4-dichlorobenzenesulfonamide and 215 g. of dichloroacetyl chloride is placed in a 500 ml. one-neck round-bottom flask equipped with a reflux condenser and drying tube. The mixture is heated to reflux for 24 hours and then cooled. Carbon tetrachloride is added to cause precipitation of the product which is removed by filtration. The solid is then suspended in 700 ml. of water and dissolved by the addition of sodium bicarbonate. The aqueous solution is then filtered and the solid reprecipitated by acidification of the filtrate to a pH of 1 with hydrochloric acid. The solid is then removed by filtration and recrysallized from ethylene dichloride to yield 104 g. of the desired product, M.P. 121–122.5° C.

*Analysis.*—Calcd. for $C_8H_5Cl_4NO_3S$: C, 28.51; H, 1.49; Cl, 42.08. Found: C, 28.93, 29.22; H, 1.80, 1.91; Cl, 41.33, 42.83.

EXAMPLE 2
2,2-Dichloro-N-Octylsulfonylacetamide

A mixture of 59. g. of octanesulfonamide and 70 g. of dichloroacetyl chloride is heated to reflux for three hours. The mixture is then cooled and carbon tetrachloride added to form a suspension which is filtered. The solid thus collected is washed with pentane and dried to yield 78 g. of product, M.P. 94–97°. The product is purified by recrystallization from ethylenedichloride to yield 64 g. of the desired compound melting at 98–95.5°.

*Analysis.*—Calcd. for $C_{10}H_{19}Cl_2NO_3S$: N, 4.61; Cl, 23.30. Found: N, 4.70, 4.67; Cl, 22.44.

EXAMPLE 3
2,2-Dichloro-N-[p-(1-Ethylpropyl)Phenylsulfonyl]-Acetamide

A mixture of 113.7 g. of p-(1-ethylpropyl)phenylsulfonamide and 150 g. of dichloroacetyl chloride is refluxed for two and one-half hours. The excess dichloroacetyl chloride is then removed in vacuo. Water is added to the residue and enough sodium bicarbonate added to dissolve all of the semi-solid present. The aqueous solution is treated with Darco and filtered. Acidification of the filtrate with hydrochloric acid to pH 1 causes the formation of an oily layer which solidifies slowly. An additional purification by dissolution of the product in base and precipitation with hydrochloric acid yields a material melting at 46–65°.

EXAMPLE 4
2,2,2-Trichloro-N-(3,4-Dichlorophenylsulfonyl)-Acetamide

From 30 g. of 3,4-dichlorobenzenesulfonamide and 100 ml. of trichloroacetyl chloride refluxed in the usual manner there is obtained 28 g. of crude product melting at 125–130°. This material is purified by dissolution in a sodium bicarbonate solution and filtration of the basic solution. Acidification of the filtrate with hydrochloric acid to pH 1 causes precipitation of the desired product. The purification procedure is repeated several times to yield 23 g. of product melting at 139–141°.

*Analysis.*—Calcd. for $C_8H_4Cl_5NO_3S$: C, 25.87; H, 1.08; Cl, 47.73. Found: C, 26.51; H, 1.41; Cl, 47.27.

This compound is also prepared by adding 36.4 g. of 3,4-dichlorobenzenesulfonamide to a solution of 20 g. of trichloroacetyl chloride in 50 ml. of anhydrous dioxane and 25 ml. of triethylamine at a temperature below 35°. After the addition is completed, the reaction mixture is poured into 400 ml. of water which is then made acid to pH 1 with hydrochloric acid. The solid is removed by filtration and washed with water. The crude product thus obtained is purified as described above.

EXAMPLE 5
2,2-Dichloro-N-(3,5-Dichlorophenylsulfonyl)-Acetamide

A suspension of 50 g. of 3,5-dichlorobenzenesulfonamide in 100 g. of dichloroacetyl chloride is heated to reflux for forty-eight hours. The mixture is allowed to cool and carbon tetrachloride is added to the mixture to facilitate removal of unreacted acid halide by filtration. The crude product is purified using the procedure outlined in Examples 3 or 4.

EXAMPLE 6
2-Chloro-N-(3,4-Dichlorophenylsulfonyl)-Acetamide

A mixture of 50 g. of 3,4-dichlorobenzenesulfonamide and 100 ml. of chloroacetyl chloride is refluxed for three hours and allowed to cool to room temperature. The solid thus formed is broken up and suspended in carbon tetrachloride. The suspension is filtered and the solid washed with additional carbon tetrachloride. The 55 g. of product thus obtained melts at 112–137°. Purification of the product using the method described in Example 1 yields 33 g. of the desired product melting at 152–154°.

*Analysis.*—Calcd. for $C_8H_6Cl_3NO_3S$: C, 31.75; H, 2.00. Found: C, 31.07; H, 1.97.

EXAMPLE 7
2,2-Dichloro-N-2-Naphthylsulfonylacetamide

Fifteen grams of dichloroacetyl chloride is added dropwise to an efficiently stirred suspension of 20.7 g. of 2-naphthylsulfonamide in 100 ml. of dioxane and 50 ml. of dry triethylamine. After all of the acid chloride is added, the mixture is poured into ice water and allowed to stand until the gummy precipitate thus formed solidifies. The solid is filtered off, washed with water and dried to yield 21 g. of crude product M.P. 82–115°. The product is recrystallized from dioxane to M.P. 134–135.5°.

EXAMPLE 8
2,2-Dichloro-N-(3-Chloro-4-Isobutylphenylsulfonyl)-Acetamide

A vigorously stirred mixture containing 219 g. of 3-chloro-4-isobutylbenzenesulfonamide and 69 g. of finely pulverized potassium carbonate in 1800 ml. of anhydrous acetone is refluxed for one hour and then 113 g. of dichloroacetyl chloride is added to the mixture slowly. The reaction mixture is stirred and heated to reflux for an additional eight hours and filtered. Evaporation of the filtrate yields the desired product which is purified by precipitation from an ethyl acetate solution by the addition of pentane.

TABLE I

[Further examples of N-acylsulfonamides prepared by refluxing sulfonamides and an appropriate acylating agent with or without an additional solvent are as follows:]

| Ex. No. | Sulfonamide used | Acid chloride or anhydride | Solvent | Time | Product |
|---|---|---|---|---|---|
| 9 | 3,4-dichlorobenzene-sulfonamide, 221 g. | 2,2-dichloropropionyl chloride, 250 g. | None | 6 hrs. | 2,2-dichloro-N-(3,4-dicholorophenylsulfonyl)-propionamide. |
| 10 | 2,4-dichlorobenzene-sulfonamide, 221 g. | Dichloroacetyl chloride, 220 g. | do | 10 hrs. | 2,2-dichloro-N-(2,4-dichlorophenylsulfonyl)-acetamide. |
| 11 | 3,4-dichlorobenzene-sulfonamide, 221 g. | Difluoroacetic anhydride, 175 g. | Dioxane, 800 g. | 1 day | N-(3,4-dichlorophenylsulfonyl)-2,2-difluoroacetamide. |
| 12 | 2,6-dichlorobenzene-sulfonamide, 221 g. | 2-chloro-2-phenylacetyl chloride, 149 g. | Toluene, 1,000 g. | 2 days | 2-chloro-N-(2,6-dichlorophenylsulfonyl)-2-phenylacetamide. |
| 13 | 3,5-dichlorobenzene-sulfonamide, 221 g. | Chloroacetyl chloride, 250 g. | None | 12 hrs. | 2-chloro-N-(3,5-dichlorophenylsulfonyl)-acetamide. |

TABLE I—Continued

| Ex. No. | Sulfonamide used | Acid chloride or anhydride | Solvent | Time | Product |
|---|---|---|---|---|---|
| 14 | 2,2,2-trichloro-N-(2,4,5-trichlorophenylsulfonyl)acetamide, 256 g. | Trichloroacetyl chloride, 250 g. | ___do___ | 1 day | 2,2,2-trichloroacetyl-N-(2,4,5-trichlorophenylsulfonyl)acetamide. |
| 15 | 3,5-dichlorobenzenesulfonamide, 221 g. | 2-chloropropionyl chloride, 250 g. | ___do___ | 8 hrs | 2-chloro-N-(3,5-dichlorophenylsulfonyl)propionamide. |
| 16 | 3,5-dichlorophenylbenzenesulfonamide, 221 g. | Fluoroacetic anhydride, 139 g. | Dioxane, 800 ml | 1 day | N-(3,5-dichlorophenylsulfonyl)fluoroacetamide. |
| 17 | p-Chlorobenzenesulfonamide, 180 g. | Bromoacetyl bromide, 202 g. | ___do___ | ___do___ | 2-bromo-N-(p-chlorophenylsulfonyl)acetamide. |
| 18 | ___do___ | Dichloroacetylchloride, 250 g. | None | 6 hrs | 2,2-dichloro-(p-chlorophenylsulfonyl)acetamide. |
| 19 | ___do___ | 2-chloropripionylchloride, 240 g. | ___do___ | 1 day | N-(p-chlorophenylsulfonyl)-2-chloropropionamide. |
| 20 | ___do___ | 2-chlorobutyryl chloride, 142 g. | Benzene, 800 ml. | ___do___ | 2-chloro-N-(p-chlorophenylsulfonyl)butyramide. |
| 21 | p-Butylbenzenesulfonamide, 184 g. | Chloroacetyl chloride, 220 g. | None | 6 hrs | N-(p-butylphenylsulfonyl)-2-chloroacetamide. |
| 22 | ___do___ | 2,2-dichloropropionyl chloride, 165 g. | Dioxane | 1 day | N-(p-butylphenylsulfonyl)-2,2-dichloropropionamide. |
| 23 | 1-naphthylsulfonamide, 158 g. | Trichloroacetyl chloride, 250 g. | None | 2 days | 2,2,2-trichloro-N-1-naphthylsulfonylacetamide. |
| 24 | 2-naphthylsulfonamide, 158 g. | Trifluoroacetic anhydride, 210 g. | Dioxane | 1 day | 2,2,2-trifluoro-N-2-naphthylsulfonylacetamide. |
| 25 | Octylsulfonamide, 193 g. | Trichloroacetyl chloride, 250 g. | None | 10 hrs | 2,2,2-trichloro-N-octylsulfonylacetamide. |
| 26 | ___do___ | 2-chloropropionyl chloride, 240 g. | ___do___ | ___do___ | 2-chloro-N-octylsulfonylacetamide. |
| 27 | ___do___ | Difluoroacetic anhydride, 175 g. | Dioxane | 1 day | 2,2-difluoro-N-octylsulfonylacetamide. |
| 28 | p-(1-ethylpropyl)-benzenesulfonamide, 151 g. | Trichloroacetyl chloride, 250 g. | None | 6 hrs | 2,2,2-trichloro-N-[p-(1-ethylpropyl)phenylsulfonyl]acetamide. |
| 29 | ___do___ | 2-chloropropionyl chloride, 240 g. | ___do___ | hrs | 2-chloro-N-[p-(1-ethylpropyl)-phenylsulfonyl]propionamide. |
| 30 | 4-butyl-2-chlorobenzenesulfonamide, 219 g. | 2-bromo-2-phenylacetyl bromide, 278 g. | Benzene, 1,000 g. | 1 day | 2-bromo-N-(4-butyl-2-chlorophenylsulfonyl)-2-phenylacetamide. |
| 31 | 2-chloro-4-pentyl benzenesulfonamide, 233 g. | 2,2-dichloro-2-phenyl-acetyl chloride, 223 g. | Toluene, 1,000 g. | ___do___ | 2,2-dichloro-N-(2-chloro-4-pentylphenylsulfonyl)-2-phenylacetamide. |
| 32 | 2,5-dichlorobenzene sulfonamide, 221 g. | 2-chloro-3-phenylpropionyl chloride, 202 g. | Benzene, 1,000 g. | 10 hrs | 2-chloro-N-(2,5-dichlorophenylsulfonyl)-3-phenylpropionamide. |
| 33 | 2,4-dichlorobenzene sulfonamide, 331 g. | 2-fluoro-2-phenylacetyl chloride, 207 g. | Dioxane, 1,000 g. | 14 hrs | N-(2,4-dichlorophenylsulfonyl)-2-fluoro-2-phenylacetamide. |

EXAMPLE 34

N-(3,4-Dichlorophenylsulfonyl)-2-Methylsulfonyl-Acetamide

A mixture of 32.5 g. of sodium salt of 2-chloro-N-(3,4-dichlorophenylsulfonyl)acetamide and 10.2 g. of sodium methane-sulfonate in 150 ml. of ethanol is refluxed for three hours. The alcohol is removed under reduced pressure and the residue is dissolved in water. The water is made acid by adding concentrated hydrochloric acid and the product separates as white crystals. After filtering and drying the product may be recrystallized from ethanol.

EXAMPLE 35

N-(3,4-Dichlorophenylsulfonyl)-2-Nitroacetamide

A mixture of 32.5 g. of the sodium salt of 2-chloro-N-(3,4-dichlorophenylsulfonyl)acetamide and 8 g. of sodium nitrite in 150 ml. of dimethylformamide is heated to 100° for six hours. The mixture is allowed to cool and poured into 300 ml. of water and filtered to remove any insoluble impurities present. The product is then isolated by the acidification of the filtrate and may be purified by recrystallization from ethylenedichloride.

TABLE II

[Further examples of N-acylsulfonamides prepared by the metathetical reaction involving an anion and the salt of a metal, 2-halo-6-acylsulfonamide of this invention are as follows:]

| Ex. | Metal salt of 2-halo-N-acylsulfonamide used | Sodium salt used | Solvent | Time | Temp. | Product |
|---|---|---|---|---|---|---|
| 36 | 2-chloro-N-(3,4-dichlorophenylsulfonyl)-acetamide, sodium salt, 161 g. | Sodium ethane-sulfinate, 58 g. | Ethanol, 800 ml. | 6 hrs | Reflux | N-(3,4-dichlorophenylsulfonyl)-2-ethylsulfonylacetamide. |
| 37 | 2-chloro-N-(3,4-dichlorophenylsulfonyl)-propionamide, potassium salt, 188 g. | Sodium methane-sulfinate, 51 g. | ___do___ | ___do___ | ___do___ | N-(3,4-dichlorophenylsulfonyl)-2-methylsulfonylpropionamide. |
| 38 | 2-chloro-N-(3,4-dichlorophenylsulfonyl)-acetamide, potassium salt, 188 g. | Sodium dodecane-sulfinate, 128 g. | ___do___ | ___do___ | ___do___ | N-(3,4-dichlorophenylsulfonyl)-2-dodecylsulfonylacetamide. |
| 39 | 2-chloro-N-(3,4-dichlorophenylsulfonyl)-acetamide, sodium salt, 161 g. | Sodium nitrite, 35 g. | Dimethyl-formamide, 700 ml. | 1 day | 100° | N-(3,4-dichlorophenylsulfonyl)-2-nitroacetamide. |
| 40 | 2-chloro-N-(3,4-dichlorophenylsulfonyl)-butyramide, sodium salt, 176 g. | ___do___ | Dimethyl-formamide, 900 ml. | 1½ days | 100° | N-(3,4-dichlorophenylsulfonyl)-2-nitrobutyramide. |
| 41 | 2-chloro-N-(3,5-dichlorophenylsulfonyl)-acetamide, sodium salt, 161 g. | ___do___ | Dimethylformamide, 750 ml. | 1 day | 100° | N-(3,5-dichlorophenylsulfonyl)-2-nitroacetamide. |
| 42 | 2-chloro-N-(3,5-dichlorophenylsulfonyl)-propionamide, sodium salt, 169 g. | Sodium methane-sulfinate, 51 g. | Ethanol, 800 ml. | 8 hrs | Reflux | N-(3,5-dichlorophenylsulfonyl)-2-methylsulfonylpropionamide. |
| 43 | 2-chloro-N-(p-chlorophenylsulfonyl)-acetamide, sodium salt, 144 g. | Sodium dodecane-sulfinate, 128 g. | ___do___ | 1 day | ___do___ | N-(p-chlorophenylsulfonyl)-2-dodecylsulfonylacetamide. |
| 44 | N-(p-butylphenylsulfonyl)-2-chloropropionamide, sodium salt, 145 g. | Sodium methane-sulfinate, 51 g. | Ethanol, 700 ml. | ___do___ | ___do___ | N-(p-butylphenylsulfonyl)-2-methylsulfonylpropionamide. |
| 45 | N-(p-butylphenylsulfonyl)-2-chlorobutyramide, sodium salt, 153 g. | Sodium nitrite, 35 g. | Dimethylformamide, 800 ml. | 2 days | 100° | N-(p-butylphenylsulfonyl)-2-nitrobutyramide. |
| 46 | 2-chloro-N-2-naphthylsulfonylacetamide, sodium salt, 135 g. | ___do___ | ___do___ | 1 day | 100° | N-(2-naphthylsulfonyl)-2,2-dichloroacetamide. |
| 47 | 2-chloro-N-1-naphthylsulfonylacetamide, sodium salt, 135 g. | Sodium methane-sulfinate, 51 g. | Ethanol, 800 ml. | ___do___ | Reflux | 2-chloro-methyl-N-1-naphthylsulfonylacetamide. |
| 48 | 2-chloro-N-octylsulfonylbutyramide, sodium salt, 154 g. | Sodium nitrite, 35 g. | Dimethylformamide, 800 ml. | 2 days | 100° | 2-nitro-N-octylsulfonylbutyramide. |
| 49 | 2-chloro-N-octylsulfonylacetamide, sodium salt, 140 g. | Sodium propane-sulfinate, 65 g. | Ethanol, 800 ml. | 10 hrs | Reflux | N-octylsulfonyl-2-propylsulfonylacetamide. |
| 50 | 2-chloro-N-(2,3-dichlorophenylsulfonyl) acetamide, sodium salt, 321 g. | Sodium benzene-sulfinate, 164 g. | Ethanol, 1,800 ml. | 1 day | ___do___ | N-(2,3-dichlorophenylsulfonyl)-2-phenylsulfonylacetamide. |
| 51 | 2-chloro-N-(2,4,5-trichlorophenylsulfonyl) propionamide, sodium salt, 356 g. | Sodium-p-toluene sulfinate, 178 g. | ___do___ | ___do___ | ___do___ | N-(2,4,5-trichlorophenylsulfonyl)-2-(p-toluene)sulfonylpropionamide. |

EXAMPLE 52

2,2-Dichloro-N-(3,4-Dichlorophenylsulfonyl)-Acetamide, Sodium Salt

To a stirred suspension of 44 g. of N-(3,4-dichlorophenylsulfonyl)acetamide in 100 ml. of water one adds 12.5 g. of sodium bicarbonate. The solution is filtered and the water is removed in vacuo and the product is obtained as a crystalline residue.

EXAMPLE 53

2,2-Dichloro-N-(3,4-Dichlorophenylsulfonyl)-Acetamide, Potassium Salt

A suspension of 34 g. of N-(3,4-dichlorobenzenesulfonyl)-α,α-dichloroacetamide in 100 ml. of water is stirred as 15 g. of potassium bicarbonate is added. A rapid evolution of carbon dioxide occurs and a white solid separates. The products is filtered and washed well with water and dried. The yield is 30 g. of white crystals, M.P. 89–93°. This product may be purified by dissolving in ethyl acetate and precipitating the product by adding cyclohexane. By repeating this twice, a sample is obtained. M.P. 90–93°.

*Analysis.*—Calcd. for $C_8H_4Cl_4NO_3SK$: C, 25.61; H, 1.07; Cl, 37.81. Found: C, 25.36; H, 3.51; Cl, 36.33.

EXAMPLE 54

2-Chloro-N-(2,4-Dichlorophenylsulfonyl)-Acetamide, Ammonium Salt

To an aqueous suspension containing 30.1 g. of 2-chloro-N-(2,4-dichlorophenylsulfonyl)acetamide is added 100 ml. of 28% ammonium hydroxide with vigorous stirring. The product is obtained after removal of the water.

Other compounds which can be substituted in place of the active ingredient of the above example are:

Example B:
  N-(3,4-dichlorophenylsulfonyl)-2-methylsulfonylacetamide.

Example C:
  2-chloro-N-(2,5-dichlorophenylsulfonyl)-3-phenylpropionamide.

Example D:
  N-(p-butylphenylsulfonyl)-2,2-dihloropropionamide.

Example E: Parts by wt.
  2,2-dichloro-N-(3,4-dichlorophenylsulfonyl)-
    acetamide, sodium salt _____ 1.0
  Tetramethyl thiuram disulfide _____ 75.0
  Kaolin _____ 20.0
  Methocel 15 (methyl cellulose-adhesive and
    dispersing agent) _____ 3.0
  Alkanol B _____ 1.0

Mixing, grinding and application are the same as in Example A, with the exception that pine tree seeds are treated. In a like manner, the following compounds may be used in the above formulation in place of the active ingredient therein.

Example F:
  2-chloro-N-(2,4-dichlorophenylsulfonyl)acetamide, ammonium salt.

Example G:
  N-(3,4-dichlorophenylsulfonyl)-2-nitroacetamide.

Example H: Parts by wt.
  2-chloro-N-(2,4-dichlorophenylsulfonyl)-acetamide, sodium salt _____ 5.0
  Methocel 15 _____ 1.0
  Water _____ 94.0

TABLE III

[Additional examples of salts of N-acylsulfonamides prepared by the reaction of the appropriate N-acylsulfonamide acid and an aqueous solution containing the desired cation are as follows:]

| Ex. | Acylsulfonamide and g. taken | Cation source | Product |
|---|---|---|---|
| 55 | 2,2-dichloro-N-octylsulfonylacetamide, 305 g. | Dimethylamine, 50 g. | 2,2-dichloro-N-octylsulfonylacetamide, dimethyl ammonium salt. |
| 56 | 2,2-dichloro-N-[p-(1-ethylpropyl)phenylsulfonyl]-acetamide, 338 g. | Trimethylamine, 70 g. | 2,2-dichloro-N-[p-(1-ethylpropyl)-phenylsulfonyl]acetamide, trimethyl ammonium salt. |
| 57 | 2,2,2-trichloro-N-(3,4-dichlorophenylsulfonyl)acetamide, 371 g. | Triethylamine, 110 g. | 2,2,2-trichloro-N-(3,4-dichlorophenylsulfonyl)acetamide, triethyl ammonium salt. |
| 58 | 2,2-dichloro-N-(3,5-dichlorophenylsulfonyl)acetamide, 337 g. | n-Butylamine, 85 g. | 2,2-dichloro-N-(3,5-dichlorophenylsulfonyl)acetamide, n-butyl ammonium salt. |
| 59 | 2-chloro-N-(3,4-dichlorophenylsulfonyl)acetamide, 304 g. | Tetramethyl ammonium hydroxide, 91 g. | 2-chloro-N-(3,4-dichlorophenylsulfonyl)-acetamide, tetramethyl ammonium salt. |
| 60 | 2-chloro-N-(2,6-dichlorophenylsulfonyl)-2-phenylacetamide, 380 g. | Calcium chloride, 55 g. | 2-chloro-N-(2,6-dichlorophenylsulfonyl)-2-phenylacetamide, calcium salt. |
| 61 | N-(3,4-dichlorophenylsulfonyl)-2-nitroacetamide, 315 g. | Magnesium chloride 48 g. | N-(3,4-dichlorophenylsulfonyl)-2-nitroacetamide, magnesium salt. |
| 62 | N-(3,4-dichlorophenylsulfonyl)-2-phenylsulfonylacetamide, 444 g. | Ethylamine, 45 g. | N-(3,4-dichlorophenylsulfonyl)-2-phenylsulfonylacetamide, ethyl ammonium salt. |

*Examples of Compositions Useful for Coating Seeds to Render Them Obnoxious to Rodents, Rabbits, Etc.*

Example A: Parts by wt.
  2,2-dichloro-N-(3,4-dichlorophenylsulfonyl)-
    acetamide _____ 1.0
  Tetramethyl thiuram disulfide _____ 75.0
  Kaolin _____ 20.0
  Alkanol B (alkyl aryl sodium sulfonate)
    wetting agent _____ 1.0
  Goulac (sodium lignin sulfonate) dispersing
    agent _____ 3.0

The ingredients are blended in a ribbon type blender and then ground in a hammer or an air attrition mill to a particle size substantially less than 10 microns. Two pounds of this mixture are dispersed in one gallon of water and the resulting slurry is applied to Douglas fir seeds at the rate of 5 ounces per bushel of seed. This treatment renders the seeds obnoxious to rats.

A solution of the above ingredients is applied to coniferous tree seeds at the rate of 5 ounces per bushel of seed or the amount applied can be varied by first diluting the concentrated solution with water. For instance, the concentrated solution containing 5% of the compound is diluted with 4 parts of water and this diluted solution applied to seed at the rate of 5 ounces per bushel of seed.

The following compounds may be used in a like manner to that described in the preceding example.

Example I:
  2,2-dichloro-N-1-naphthylsulfonylacetamide, sodium salt.

Example J:
  2,2-difluoro-N-octylsulfonylacetamide, sodium salt.

Example K: Parts by wt.
  2-chloro-N-octylsulfonylacetamide _____ 20
  Bentonite _____ 20
  Kaolin _____ 58
  Alkanol B _____ 2

The ingredients are blended in a ribbon type blender and then ground in an air attrition mill to a particle size substantially less than 10 microns. Two pounds of this compound are dispersed in one gallon of water and the resulting slurry is applied to seed at the rate of 5 ounces per bushel of Douglas fir seed. It is found that rats avoid eating the treated seed.

Additional compounds which may be formulated in the manner described above are:

Example L:
    2,2 - dichloro - N-(3,4-dichlorophenylsulfonyl)acetamide, potassium salt.

Example M:
    N-(2,3-dichlorophenylsulfonyl) - 2 - phenylsulfonylacetamide.

Example N:
    N-(p-butylphenylsulfonyl)-2-nitrobutyramide.

Example O:
    The amount of compound applied in Example K can be reduced by dispersing as little as 0.1 pound in one gallon of water then adding 5 ounces per bushel of seed.

This application is a continuation-in-part of my co-pending U.S. application Serial No. 646,962, filed March 19, 1957, for "Product and Process," now abandoned.

I claim:

1. A compound of the formula:

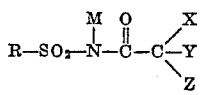

wherein R is selected from the group consisting of alkyl of from 5 through 8 carbon atoms, alpha-naphthyl, beta-naphthyl, and

where:

A is chloro,

B is selected from the group consisting of chloro, alkyl of 4 to 5 carbon atoms, and phenyl, n is a whole number of from 1 through 5, m is a whole number of from 1 through 2;

X is selected from the group consisting of nitro, chloro, bromo, fluoro, phenylsulfonyl, p-methylphenylsulfonyl, and alkylsulfonyl wherein the alkyl is 1 through 12 carbon atoms; Y is selected from the group consisting of hydrogen, chloro, bromo, fluoro, phenyl, and alkyl of 1 through 3 carbon atoms; Z is selected from the group consisting of hydrogen, chloro, bromo, and phenyl; with the proviso that when X is selected from the group consisting of nitro, phenylsulfonyl, p-methylphenylsulfonyl, and alkylsulfonyl, Y must be selected from the group consisting of hydrogen, phenyl, and alkyl of from 1 through 3 carbon atoms, and Z must be hydrogen; and M is selected from the group consisting of hydrogen, sodium, potassium, ammonium, monomethylammonium, dimethylammonium, trimethylammonium, and tetramethylammonium, monoethylammonium, diethylammonium, and triethylammonium, calcium and magnesium wherein the second valence of the metal is attached to another

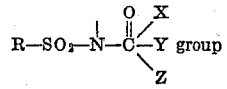

2. 2,2-dichloro - N - (3.4-dichlorophenylsulfonyl)-acetamide.

3. 2,2-dichloro - N-[p-(1-ethylpropyl)phenylsulfonyl]-acetamide.

4. 2,2,2-trichloro - N - (3,4-dichlorophenylsulfonyl)-acetamide.

5. 2,2-dichloro-N-2-naphthylsulfonylacetamide.

No references cited.